Feb. 11, 1936. T. G. A. SILLERS 2,030,121
PRESSURE RELIEF VALVE
Filed Dec. 19, 1932

Inventor
T. G. A. Sillers
by G. J. O'Brien
Attorney

Patented Feb. 11, 1936

2,030,121

UNITED STATES PATENT OFFICE 2,030,121

PRESSURE RELIEF VALVE

Thomas G. A. Sillers, Milwaukee, Wis., assignor to Allis-Chalmers Manufacturing Company, Milwaukee, Wis., a corporation of Delaware Application December 19, 1932, Serial No. 647,930

11 Claims. (Cl. 251—125)

This invention relates to improvements in pressure relief valves and more particularly to a pressure relief valve especially adapted for use with electrical equipment subject to the rapid formation of large quantities of gases.

Electrical equipment which is immersed in oil, such as circuit breakers, transformers, etc., may be subjected to such conditions as will cause the formation of large quantities of gases. Excessive quantities of gases must be vented quickly to prevent distortion or destruction of the chamber containing the electrical equipment and the insulating medium. It is, however, also required that the vent for such gases be fairly tightly closed at all times except when discharging the gases for the purpose of avoiding the entrance of moisture into the chamber through such vent. Other requirements of such valve are that the valves permit the escape of gases, which accumulate slowly, without operation of the valve and that the valve reseat itself automatically upon operation thereof for the purpose of venting gases at predetermined pressures. It is, of course, necessary that a valve of the character described be manufactured as inexpensively as possible and with the minimum number of parts to reduce the cost of such valves and to minimize the danger of failure of operation due to failure of cooperation of the parts.

It is, therefore, an object of the present invention to provide a pressure relief valve especially adapted for use with electrical equipment in which the valve will permit escape of gases formed normally without operation of the valve and which will open fully upon the occurrence of predetermined excess pressures on the valve.

Another object of the present invention is to provide a pressure relief valve especially adapted for use with electrical equipment in which the valve may be adjusted to operate at any desired pressure.

Another object of the invention is to provide a latched pressure relief valve especially adapted for use with electrical equipment in which the valve will automatically reseat and relatch itself in position for normal operation of the equipment after operation of such valve due to the formation of excessive pressures within such equipment.

Objects and advantages, other than those above set forth, will be apparent from the following description when read in connection with the accompanying drawing, in which:

Fig. 1 is a vertical partial sectional view illustrating an embodiment of the invention as applied to an electric circuit breaker, the contacts of which are immersed in insulating material subject to the formation of gases upon operation of the circuit breaker, the valve being in line with an insulator supporting one of the contacts for which reason the portion of the insulator exteriorly of the circuit breaker is not shown;

Figure 1:
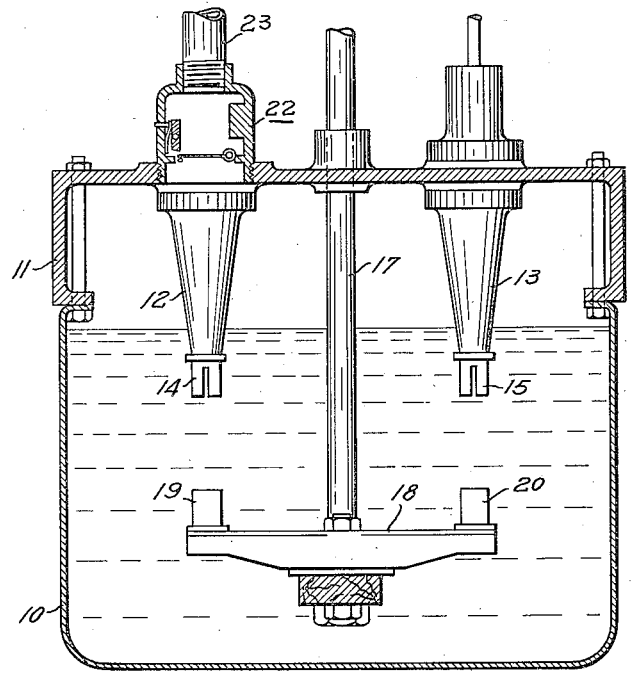

Referring more particularly to the drawing by characters of reference, the reference numeral 10 designates an open-topped chamber or tank which is preferably metallic and is closed by a cover or top 11 attached thereto in substantially moisture tight relation. The top 11 is formed with a plurality of apertures therethrough which receive insulators as indicated at 12 and 13 through which conductors extend from an electric circuit to be interrupted (not shown) to fixed or stationary contacts as at 14 and 15. An aperture located centrally, as respects the apertures through which the insulators extend, receives a rod as at 17 supporting and carrying a cross bar or bridge 18 on which are mounted contacts 19 and 20 which are movable into and out of engagement with the fixed contacts 14 and 15. Any of the well known means may be used to operate rod 17 as may be desired. It will be understood that the tank 10, 11 is adapted to receive and retain any desired insulating medium in such quantity as to raise the level thereof above the fixed contacts 14 and 15.

An aperture in top 11 is provided for the reception of a pressure relief valve generally designated at 22 and connected with a vent pipe 23. The valve is shown as being arranged in line with insulator 12 but it will be understood that the valve may be located wherever desired in the walls of the tank provided only that the valve is above the level of the insulating fluid in the tank 10, 11. The valve 22 generally comprises a valve body or housing 26 within which is mounted a valve 27 together with means for latching or retaining the valve 27 in position except under abnormal conditions and means for returning such valve to its normal position after the occurrence of abnormal conditions in the equipment. The valve body 26 is threaded interiorly at the upper end thereof and exteriorly at the lower end thereof to receive vent pipe 23 and to provide for attachment of the valve 26 within the aperture therefor in the top 11. The valve body is formed with ledges 28 and 29 and bosses 31 and 32 therein, which, taken together, define a substantially rectangular opening. The valve 27 which is formed of flexible, resilient material such as spring steel, is mounted on pin 33 extending through the valve body and is normally retained against stop pins 34, extending into the valve body, by means of a spring 36.

The valve 27 is held on the stop pins 34 under normal conditions by means of a latch 41 which is mounted on a pin 42 extending through the valve body. The latch is positioned within the valve body by washers 43 which contact with the sides of the latch and the valve body in such manner as to locate the latch centrally of the sides of the rectangular opening through the valve body which is to be closed by the valve. The latch is positioned by a spring 44 which tends to rotate the latch in a counter-clockwise direction against an adjustable stop 46. The position of the stop 46 determines the amount of flexure required of the valve before the same may slip from under the end of the latch.

In normal operation of the circuit breaker, the gases produced are vented through the spaces between the valve, the ledges 28 and 29 and the bosses 31 and 32, in spite of the fact that such spaces are kept as small in area as possible due to the construction of the entire valve within the smallest permissible limits of manufacturing tolerances without expensive machining operations. When conditions occur within the circuit breaker which lead to the production of gases in such quantity as to be beyond the normal venting capacity of the valve, the accumulation of gases produces a pressure on the valve which tends to lift the same against the action of the spring 36 into contact with the latch 41. The movement of the valve is then stopped and further increase of pressure causes the valve 27 to bow upwardly until the edge of the valve slips from underneath the end of the latch 41 and moves in a clockwise direction and completely opens the rectangular vent through the valve body, the gases forcing the valve against a flat boss 48 formed on the interior of the valve body and above the pin 33 about which the valve pivots. As soon as the gas pressure decreases, the spring 36 rotates valve 27 in a counter-clockwise direction against the latch 41, forcing the latch back against the action of spring 44 and causing the valve to return to its former position, whereupon latch 41 returns to its previous position and the valve is reset and relatched for normal operation.

It will be understood, of course, that the stop 46 is adjusted to tension spring 44, thereby adjusting the distance to which the latch 41 will extend over the edge of the valve 27, thereby determining the amount of flexure or bowing to which the valve 27 will be subjected before the edge thereof may slip from under the latch.

Figure 2:
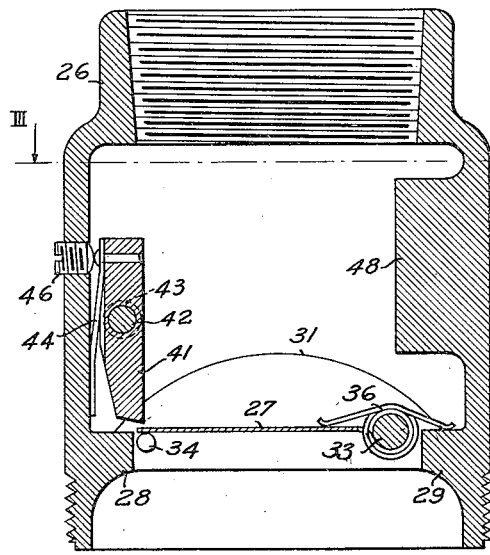
Fig. 2 is an enlarged detailed vertical sectional view of a pressure relief valve embodying the present invention.
Figure 3:
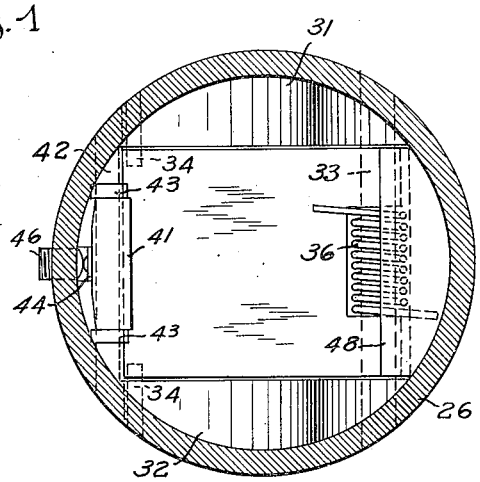
Fig. 3 is a top sectional view taken on the plane III—III of Fig. 2.
Figure 4:
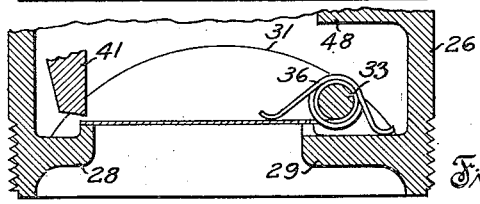
Fig. 4 is a partial vertical sectional view similar to that shown in Fig. 2 but illustrating a modified embodiment of the present invention.

Under some conditions it is desirable to set valve 27 more tightly than is possible in the embodiment shown in Fig. 2. The ledges 28 and 29 are then made as shown in Fig. 4 with upper surfaces of relatively small area which may be readily machined and pin 33 is located above and to one side of the valve opening rather than within the same. Such construction then requires a different formation of spring 36 as shown. The operation of the embodiment shown in Fig. 4 is, however, exactly the same as that shown in Fig. 2 with the exception that the amount of venting without opening of the valve is materially reduced due to the closer seating of the valve.

Although but a few embodiments of the present invention have been illustrated and described, it will be apparent to those skilled in the art that various changes and modifications may be made therein without departing from the spirit of the invention or from the scope of the appended claims.

It is claimed and desired to secure by Letters Patent:

1. In a pressure relief valve, a casing having a passageway therethrough, pins extending through said casing, an elastically flexible valve rotatably mounted on one of said pins, a latch pivotally mounted on another of said pins and operative under normal conditions to retain said valve in position to close the passageway through said casing and inoperative under abnormal conditions to retain said valve in said position, and means tending to retain said latch in a predetermined position and to permit variation of the position thereof.

2. In a pressure relief valve, a casing having a passageway therethrough, pins extending through said casing, a flexible valve rotatably mounted on one of said pins, a spring associated with said valve and tending to retain the same in position to close the passageway through said casing, a latch pivotally mounted on another of said pins and operative under normal conditions to retain said valve in a predetermined position and inoperative under abnormal conditions to retain said valve in said position, and means tending to retain said latch in a predetermined position and arranged to cause variation of the position thereof.

3. In a pressure relief valve, a casing having a passageway therethrough, pins extending through said casing, a valve of springy material rotatably mounted on one of said pins, a spring associated with said valve and tending to retain the same in position to close the passageway through said casing, a latch pivotally mounted on another of said pins and operative under normal conditions to retain said valve in a predetermined position and inoperative under abnormal conditions to retain said valve in said position, a spring associated with said latch and tending to retain the same in a predetermined position, and adjustable means acting against said spring to vary the position of said latch.

4. In a pressure relief valve, a casing having a passageway therethrough, pins extending through said casing, a flexible valve rotatably mounted on one of said pins, a spring associated with said valve and tending to retain the same in position to close the passageway through said casing, a latch pivotally mounted on another of said pins and operative under normal conditions to retain said valve in a predetermined position and inoperative under abnormal conditions to retain said valve in said position, a spring associated with said latch and tending to retain the same in a predetermined position, and a screw extending through said casing and contacting with said latch to vary the tension on said spring and thereby to vary the position of said latch.

5. In a pressure relief valve, a casing having a passageway therethrough, pins extending through said casing, a flexible valve rotatably mounted on one of said pins, a pin extending into the casing forming an abutment for said valve in one position thereof, a spring associated with said valve and tending to retain the same against said abutment pin, a latch pivotally mounted on another of said first mentioned pins and operative under normal conditions to retain said valve against said abutment pin, said latch being inoperative under abnormal conditions to retain said valve in said position, a spring associated with said latch and tending to retain the same in a predetermined position, and adjustable means acting against said spring to permit variation of the position of said latch.

6. In a pressure relief valve, a casing having a passageway therethrough, pins extending through said casing, a flexible valve rotatably mounted on one of said pins, a spring associated with said valve and tending to retain the same in position to close the passageway through said casing, a boss extending interiorly of said casing to form a stop for said valve in the position thereof opening the passageway through said casing, a latch pivotally mounted on another of said pins and operative under normal conditions to retain said valve in a predetermined position and inoperative under abnormal conditions to retain said valve in said position, a spring associated with said latch and tending to retain the same in a predetermined position, and adjustable means acting against said spring to vary the position of said latch.

7. In a pressure relief valve, a casing having a passageway therethrough, a plurality of pins extending through said casing, a resilient and flexible valve pivotally mounted on one of said pins, a spring associated with said valve tending to retain the same in position to close the passageway through said casing, a boss extending interiorly of said casing to form a stop for said valve upon opening operation thereof, a latch pivotally mounted on another of said pins operative under normal conditions to retain said valve in a predetermined position and inoperative under abnormal conditions to retain said valve in said position, a spring associated with said latch and tending to retain the same in a predetermined position, and a screw extending through a wall of said casing and contacting with said latch to vary the tension on said spring to thereby vary the position of said latch.

8. In a pressure relief valve, a substantially cylindrical casing having internal ledges and bosses defining a substantially rectangular opening therein, a plurality of pins extending through said casing, a resilient and flexible metallic valve pivotally mounted on one of said pins, a spring associated with said valve tending to retain the same in position to close the passageway through said casing, a boss extending interiorly of said casing to form a stop for said valve upon opening operation thereof, means comprising a latch pivotally mounted on another of said pins and operative under normal conditions to retain said valve in a predetermined position and inoperative under abnormal conditions to retain said valve in said position, a spring associated with said latch and tending to retain the same in a predetermined position, and a screw extending through a wall of said casing and contacting with said latch to vary the tension on said spring to thereby vary the position of said latch.

9. In a pressure relief valve, a casing having a passageway therethrough, a resilient and flexible valve rotatably mounted in said casing to close the passageway therethrough under normal conditions, a latch pivotally mounted within said casing and operative under normal conditions to retain said valve in position to close the passageway through said casing and inoperative under abnormal conditions to retain said valve in said position, and means tending to retain said latch in a predetermined position and operable to permit variation of the position thereof.

10. In a pressure relief valve, a casing having a passageway therethrough, means including a resilient and flexible valve normally closing said passageway, and means including a movable latch positioned so as to be operative under normal conditions to hold said valve in closed position and inoperative in said position under abnormal conditions to hold said valve in said position.

11. In a pressure relief valve, a casing having a passageway therethrough, means including a resilient and flexible valve normally closing said passageway, means including a latch operative under normal conditions to hold said valve in closed position and inoperative under abnormal conditions without movement thereof to hold said valve in said position and means biasing said valve toward closed position.

THOMAS G. A. SILLERS.